H. P. ROBBINS.
GREASE CUP.
APPLICATION FILED APR. 9, 1914.
1,125,400.
Patented Jan. 19, 1915.
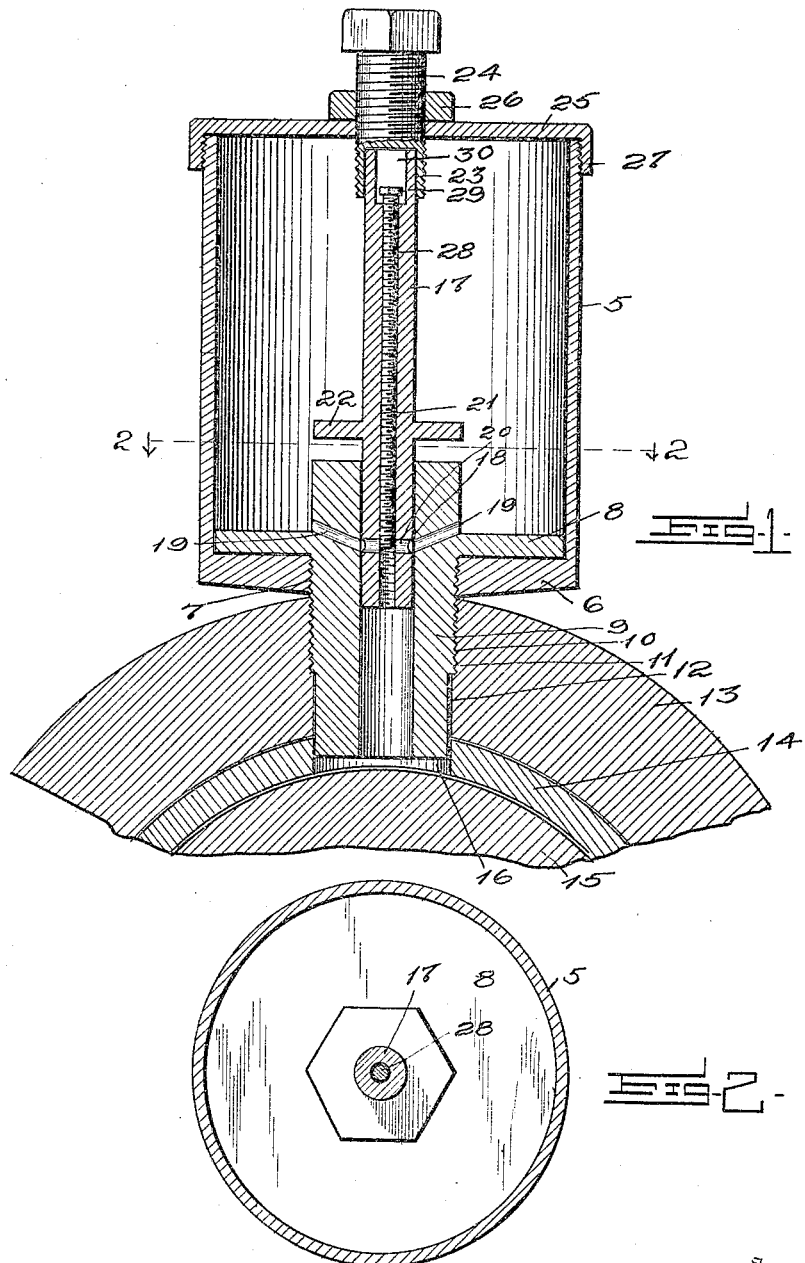
Inventor
Harry P. Robbins,
By C. L. Parker
Attorney

UNITED STATES PATENT OFFICE.

HARRY P. ROBBINS, OF RALEIGH, NORTH CAROLINA.

GREASE-CUP.

1,125,400.        Specification of Letters Patent.        Patented Jan. 19, 1915.

Application filed April 9, 1914. Serial No. 830,727.

*To all whom it may concern:*

Be it known that I, HARRY P. ROBBINS, a citizen of the United States, residing at Raleigh, in the county of Wake and State of North Carolina, have invented certain new and useful Improvements in Grease-Cups, of which the following is a specification.

My invention relates to improvements in grease cups and has particular reference to a grease cup, adapted to be connected with a movable bearing, carried by the end of a pitman, driving arm of a railway locomotive, or other element partaking of a similar movement in operation, and embodying automatically operated suction means to feed the grease or the like to the elements to be lubricated.

An important object of the invention is to provide a grease cup of the above mentioned character, which is automatic in operation, adjustable whereby different amounts of the grease or lubricant may be supplied to the parts to be treated, simple in construction, and inexpensive to manufacture.

A further object of the invention is to provide a grease cup of the above mentioned character, provided with an outlet element adapted to be substituted for the ordinary dowel-bolt, employed in retaining the bushing within the bearing, and to supply a lubricant to the bushing.

Other objects and advantages of the invention will be apparent during the course of the following description.

In the accompanying drawings forming a part of this specification and in which like numerals are employed to designate like parts throughout the same, Figure 1 is a central longitudinal sectional view through a grease cup embodying my invention, and, Fig. 2 is a horizontal sectional view taken on line 2—2 of Fig. 1.

In the drawings, wherein for the purpose of illustration is shown a preferred embodiment of my invention, the numeral 5 designates a cup or shell to hold the grease or other lubricant, the same having a bottom 6 provided with a preferably centrally arranged opening 7, preferably screw-threaded, as shown.

Arranged upon the bottom 6 of the grease cup or shell 5 is a false bottom 8, provided with an outlet tube or conduit 9, extending inwardly and outwardly beyond the false bottom 8 for substantial distances, as shown. The outer portion of the outlet tube or conduit 9 is screw-threaded for a portion of its length, as shown at 10, for engagement with the screw-threads 7 and with screw-threads 11 of an opening 12 formed through a bearing 13. This bearing is bodily movable or rotatable and is formed upon a pitman, a driving arm of a locomotive, or other element partaking of a similar movement during operation. Mounted within the bearing 13 is a bushing 14, holding a crank pin 15 or the like. The bushing 14 is provided with a laterally extending opening 16, receiving the lower end of the outlet tube or conduit 9, such end terminating at a point spaced a substantial distance from the crank pin 15, for allowing the grease or lubricant to be fed to the crank pin. The upper portion of the outlet tube or conduit 9 is formed polygonal in cross-section, as more clearly illustrated in Fig. 2, for engagement with a wrench to be inserted within the cup or receptacle 5, said outlet tube or conduit 9 being preferably integral with the false bottom 8 and serving to lock the bottoms 6 and 8 together and to the bearing 13, as is obvious.

The numeral 17 designates a tubular plunger, the lower end of which fits snugly within the outlet tube or conduit 9, to reciprocate therein. This tubular plunger is automatically reciprocated by the bodily rotatable movement of the bearing 13. The tubular plunger 17 is provided near and spaced a substantial distance from its lower end with an annular groove 18, adapted for registration with radially extending openings or ports 19 formed through the upper portion of the outlet tube, only when the tubular plunger 17 is moved to the uppermost position, as clearly illustrated in Fig. 1. The openings or ports 19 have their outer ends terminating contiguous with the upper surface of the false bottom 8, as shown. The tubular plunger 17 is provided with radially extending ports or openings 20, communicating with the annular groove 18 and leading into the axial opening or bore 21 of the same. When the tubular plunger 17 moves downwardly, the annular groove 18 is moved out of registration with the openings or ports 19, to cut off the supply of grease or lubricant, fed to the bearing.

The downward movement of the tubular plunger 17 is preferably limited by a stop-ring or flange 22, rigidly connected with the tubular plunger and preferably cast integral therewith. The stop-ring or flange operates above the upper portion of the outlet tube or conduit, 9, and is adapted to engage and disengage the same, as is obvious. The upward movement of the tubular plunger 17 is stopped by the engagement of the upper end thereof with the end wall of an axial opening 23 formed in an adjustable stop-bolt 24, the upper end of the tubular plunger reciprocating within the opening 23. The stop-bolt has screw-threaded engagement within an opening formed through a top or cover 25, there being a lock-nut 26 to clamp the adjustable stop-bolt against accidental rotation. The cover 25 is provided with a depending annular flange 27, preferably having screw-threaded engagement with the upper end of the cup or shell 5, as shown.

The axial opening or bore 21 of the tubular plunger 17 is screw-threaded, preferably throughout its entire length, for receiving a screw-threaded valve-rod 28, the lower end of which is adapted to partly or wholly close the inner discharge ends of the openings or ports 20, for regulating the passage of the grease or lubricant therethrough. At its upper end the valve-rod 28 is provided with a head 29, formed polygonal in cross-section, whereby the same may be conveniently engaged by a tool for turning it. This head is arranged within an axial opening or counter-bore 30, formed in the upper end of the tubular plunger 17.

The operation of the apparatus is as follows:—The valve-rod 28 is adjusted so that its lower end will control the passage of the desired amount of the grease or lubricant through the openings or ports 20. The tubular plunger 17 is automatically reciprocated by the bodily rotation of the bearing 13. Upon the upward movement of this tubular plunger, a partial vacuum is created within the outlet tube or conduit 9, whereby when the annular groove 18 is brought into registration with the openings or ports 19, occurring when the tubular plunger reaches its uppermost position, the grease or lubricant will be fed into the outlet tube 9. Upon the downward movement of the tubular plunger, the same serves to force the lubricant downwardly through the outlet tube or conduit 9, for supplying the same to the crank pin 15.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having described my invention, I claim:—

1. In a grease cup, a grease holding shell provided near its lower end with outlet means having supply openings leading therein, a tubular reciprocatory plunger mounted within the shell with its lower portion extending into the outlet means and having openings adapted for registration with the supply openings, and adjustable means to regulate the extent of reciprocatory movement of the tubular plunger.

2. In a grease cup, a grease holding shell provided near its lower end with outlet means having supply openings leading therein, a tubular reciprocatory plunger mounted within the shell with its lower end portion extending into the outlet means and having openings adapted for registration with the supply openings, and a valve-rod longitudinally movably mounted within the tubular plunger to be moved across the openings of the tubular plunger.

3. In a grease cup, a grease holding shell provided near its lower end with an outlet tube provided with laterally extending openings leading into the same, an internally screw-threaded tubular plunger mounted to reciprocate within a portion of the outlet tube and provided with laterally extending openings adapted for registration with the laterally extending openings of the outlet tube when the tubular plunger moves upwardly, a screw-threaded valve-rod mounted within the screw-threaded tubular plunger to have its lower end moved across the laterally extending openings of the tubular plunger and its upper end provided with a turning head arranged within a counter-bore formed in the tubular plunger and an adjustable stop-bolt provided with an opening to receive the upper end of the tubular plunger.

4. In a grease cup, a grease holding shell adapted to be connected with a movable bearing to move therewith and provided near its lower end with outlet means having a supply opening, a reciprocatory tubular plunger mounted within the shell to be moved thereby and in relation thereto with its end extending into the outlet means and provided with an opening adapted to be moved into and out of registration with the first named opening, and adjustable means to regulate the discharge of grease from the outlet end of the tubular plunger.

In testimony whereof I affix my signature in presence of two witnesses.

HARRY P. ROBBINS.

Witnesses:
JAMES L. CRAWFORD,
B. P. FISHBURNE.